March 24, 1959   J. R. NEWCOMER, JR   2,878,543
RECEPTACLE FOR STRESSED PANEL FASTENER
Filed July 12, 1956

INVENTOR.
JACOB R. NEWCOMER JR.
BY John P. Chandler
    his ATTORNEY

United States Patent Office 2,878,543
Patented Mar. 24, 1959

2,878,543
RECEPTACLE FOR STRESSED PANEL FASTENER

Jacob R. Newcomer, Jr., Westwood, N.J., assignor to Camloc Fastener Corporation, Paramus, N.J., a corporation of New York Application July 12, 1956, Serial No. 597,478

1 Claim. (Cl. 24—221)

This invention relates to improvements in receptacles for quick acting couplings or fasteners and relates more particularly to a novel structure for limiting travel in either direction of a threaded insert carried by a receptacle in a stressed panel fastener used in aircraft or the like.

One object of the present invention is to provide an improved receptacle for a quick-acting rotatable stud fastener wherein the stud is a two-part device provided with means for interlocking the two parts together when the coupling is in fastened condition but wherein the parts are readily disengaged when the panel secured by the fastener is to be removed, one of the parts of the stud remaining with the panel and the other part remaining with the receptacle.

This latter part, which is referred to hereinafter as an "insert," is externally threaded and is carried in the internally threaded receptacle. When the structures are to be fastened a quick interlock is effected between the two parts of the stud, usually by a quarter turn of the outer or headed part, and if the structures or sheets are not then drawn sufficiently tightly together, the stud is rotated further, thus advancing the insert in the receptacle.

An important object of the invention is to provide a controlled stop for limiting forward rotation of the insert to advance the same in the receptacle and also reverse rotation for retracting the insert.

It is the purpose of this type of fastener to bring substantial clamping forces on the sheets, which is accomplished through the medium of a screw driver torque acting in conjunction with the rotatable stud which is interlocked with the insert for conjoint rotation. In the event, however, that this interlock is not accomplished, which occurs when the insert has earlier been advanced too far in the receptacle, this force of great magnitude which is intended to be resolved into sheet clamping force is directed elsewhere, usually to the destruction of the fastener.

An object of the present invention is to direct the path of force into elements of the installation which are physically capable of re-acting. The consequences of advancing the insert too far before the interlock has been achieved are that it may be moved clear out of the receptacle and it is difficult to re-insert it, particularly in a blind application. Also, in some instances the insert may be advanced too far to enable the stud to retract it on reverse rotation. In such cases the insert has not moved completely out of the receptacle but the result is just as bad since it cannot be returned to stud interlocking position.

There are a number of serious consequences of retracting the insert without a controlled stop. First, should the mounting sheet have a hole larger than the insert the latter may be inadvertently freely threaded out of the receptacle. Second, in the event that the hole is smaller than the insert it is subject to severe damage by the insert cutting a thread through it. Third, if the sheet material is very hard and resists threading, or in the event that the hole is quite small the insert has the power of a screw jack which will tear the receptacle loose from the panel.

A further object of the present invention is to provide a structure which will confine the reaction of this screw jacking effect to the receptacle wall itself, thereby eliminating the above disadvantage.

In accordance with the present invention an outwardly extending annular flange is formed at the lower or outer end of the insert and a supplemental cylindrical cap with a base is force fitted or otherwise secured to the receptacle, which limits outward travel of the insert when the flange contacts the base. Conversely, opposite rotation is stopped when the flange contacts the lower end of the receptacle.

Figure 1:
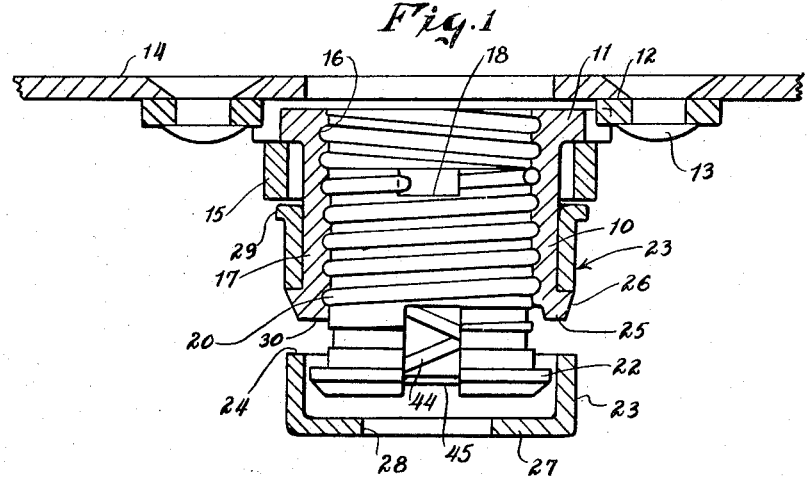
Fig. 1 is a central vertical section taken through a receptacle of the present invention.
Figure 2:
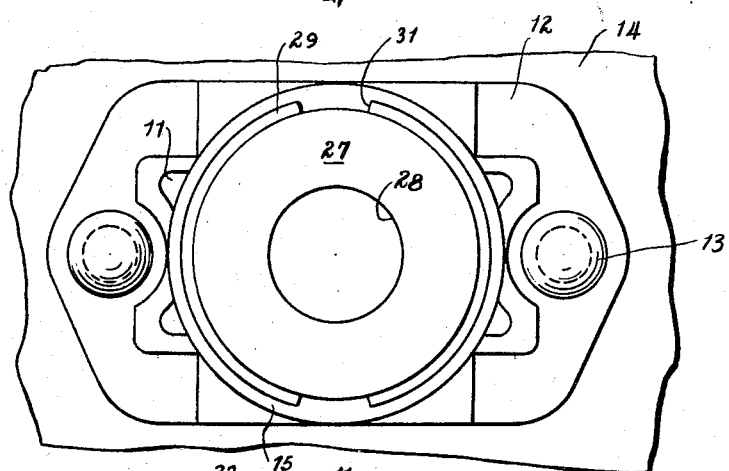
Fig. 2 is a bottom plan view thereof.

The fastener receptacle of the present invention includes a hollow cylindrical body or shell 10 having outwardly extending flanges 11 at its upper end which are received within a cage comprising a base plate 12 having rivet holes for attachment as by means of rivets 13 to a structure which may comprise a sheet 14. The base plate may be stamped from sheet metal and has a downwardly extending portion 15 forming an elastic ring-like retaining element which receives the flanges in sliding fit engagement.

The shell is provided with internal threads 16 which support an externally threaded insert 17 which is advanced or retracted within the shell by rotation of a stud 32 having abutments or lugs at its lower end which effect a driving or fastening engagement with the insert upon substantially one-quarter turn of the stud. If the sheets are not drawn together at the time the interlock is effected, further rotation of the stud causes the insert to advance in the receptacle and the sheets are thus drawn tightly together.

It is important in a fastener having these characteristics to provide non-destructive rotation restraining means between the insert and receptacle and in the illustrated embodiment the insert carries on its external threads 19 a helical wire thread coil 20 which is slightly out-of-round and thus the insert can be rotated in the receptacle with considerable difficulty. The insert is formed with a plurality of slots 18, which receive the terminals of the wire thread device.

It will be apparent that in a structure of this character the insert can be advanced too far forwardly and move clear out of the shell or at least it may be advanced so far to prevent its retraction by counter rotation of the stud. Also, if it is necessary to retract the insert in order to secure initial engagement between stud and insert the latter may be backed out too far and move right out of the upper end of the insert, thus causing one or more of the difficulties earlier referred to. Since these fasteners were designed for blind applications relative to the receptacle these difficulties do occur and it is mandatory to eliminate these destructive conditions.

The particular improvement of the present invention for preventing the occurrence of either contingency consists, first, in forming a flange-like abutment 22 at the lower end of the insert which extends beyond the outer periphery of the insert and, second, in providing a cap 23 carried externally of the shell or receptacle.

The cap is a cup-shaped structure with opposed slots 24 in its side walls, each of which extends about 30°, and the lower end of the receptacle is formed with outwardly extending lugs 25 formed with diagonal outer faces 26. Trimming flanges 29 remains at the upper end of the cap and there are formed two opposed slots 31 in the side walls of the cap, which slots are disposed at an angle of substantially 90° to slots 24. These slots 31 are provided in order to permit the cap to be resiliently forced over faces 26 of the receptacle lugs. The cap, which may be stamped or drawn from sheet metal, is force-fitted on the receptacle by moving it upwardly until the lugs are in the slots as shown in Fig. 1. The diagonal outer faces of lugs 26 facilitate this upward movement. The upper edges of slots 24 engage the upper faces of the lugs and limit downward travel of the cap after it has been fitted in place, which position is shown in Fig. 1.

Figure 3:
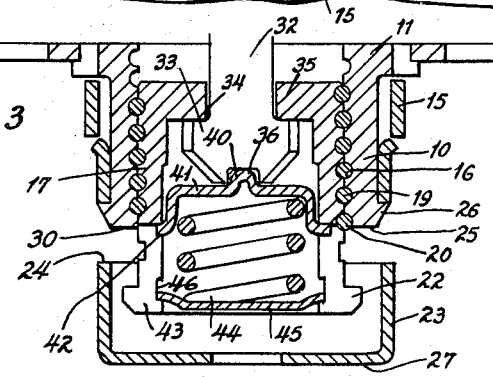
Fig. 3 is a section taken through the fastener in locked position and showing the stud in full lines.

The cap has a lower wall 27 and if desired a center hole 28 may be formed to reduce weight and to prevent the entrapment of foreign particles within the receptacle. When the hole is formed, as is preferable, the lower wall becomes, in effect, a flange or shoulder. When the insert is advanced in the shell a given distance the lower face of annular flange 22 engages lower wall 27 of the cap and forms a controlled stop limiting further rotation and downward travel. Conversely, when the insert is revolved in the opposite direction the upper face of flange 22 engages the lower annular face 30 of the receptacle, preventing further upward travel. Fig. 3 is a section taken through the entire receptacle structure and the lower end of the stud and showing the parts in fastened position. The stud 32 has abutments 33 at its lower end which pass through an opening 34 in upper wall 35 of the insert shaped to pass the abutments therethrough. This part of the fastener forms no part of the present invention and may take a variety of forms. In the form shown, the lower end of the stud has a transverse slot 36 which receives a rib 40 on a detent plate 41 having fingers 42 which are received in slots 43 in opposed walls of the insert. The plate is urged upwardly into slot 36 by a spring 44 seated on a disc 45 mounted in a recess 46 at the lower end of the insert.

It will be seen from the foregoing that these destructive forces are directed back to the receptacle elements which originally generated said forces rather than receptacle elements which are incapable of resisting these forces. For instance, with this arrangement it is impossible to generate a jacking force between the receptacle and the sheet, causing tension failure of the rivets and/or deformation of the receptacle cage or mounting hole.

While there have been described herein what are at present considered preferred embodiments of the invention, it will be obvious to those skilled in the art that many modifications and changes may be made therein without departing from the essence of the invention. It is therefore to be understood that the exemplary embodiments are illustrative and not restrictive of the invention, the scope of which is defined in the appended claim, and that all modifications that come within the meaning and range of equivalency of the claim are intended to be included therein.

What I claim is:

The combination with an internally threaded receptacle for a quick-acting fastener, said receptacle being provided with means for securement to a workpiece, and an externally threaded insert carried therein having means to cooperate with a male fastening element and whose lower end projects below the lower end of the receptacle, of means for limiting travel of the insert in both directions upon rotation thereof, said means comprising an annular abutment formed at the lower end of the insert which extends radially outwardly and which contacts the lower end of the receptacle to limit inward travel, and a sheet metal cap formed with a lower wall carried externally of the receptacle and provided with opposed slots in its side wall, the receptacle having lugs extending radially outwardly and positioned in said slots, the outer faces of said lugs being upwardly and outwardly beveled to facilitate mounting of the cap on the lower end of the receptacle, the abutment contacting said lower wall limiting outward travel of the insert.

References Cited in the file of this patent
UNITED STATES PATENTS

| | | |
|---|---|---|
| 479,632 | Crane | July 26, 1892 |
| 2,486,411 | Huelster | Nov. 1, 1949 |
| 2,514,113 | Zahodiakin | July 4, 1950 |
| 2,745,162 | Zahodiakin | May 15, 1956 |

FOREIGN PATENTS

| | | |
|---|---|---|
| 696,231 | Great Britain | Aug. 26, 1953 |